Aug. 14, 1951  W. H. RODEFELD  2,564,234
AUTOMATIC LOADING ATTACHMENT FOR HAY WAGONS
Filed Jan. 30, 1948  2 Sheets-Sheet 1
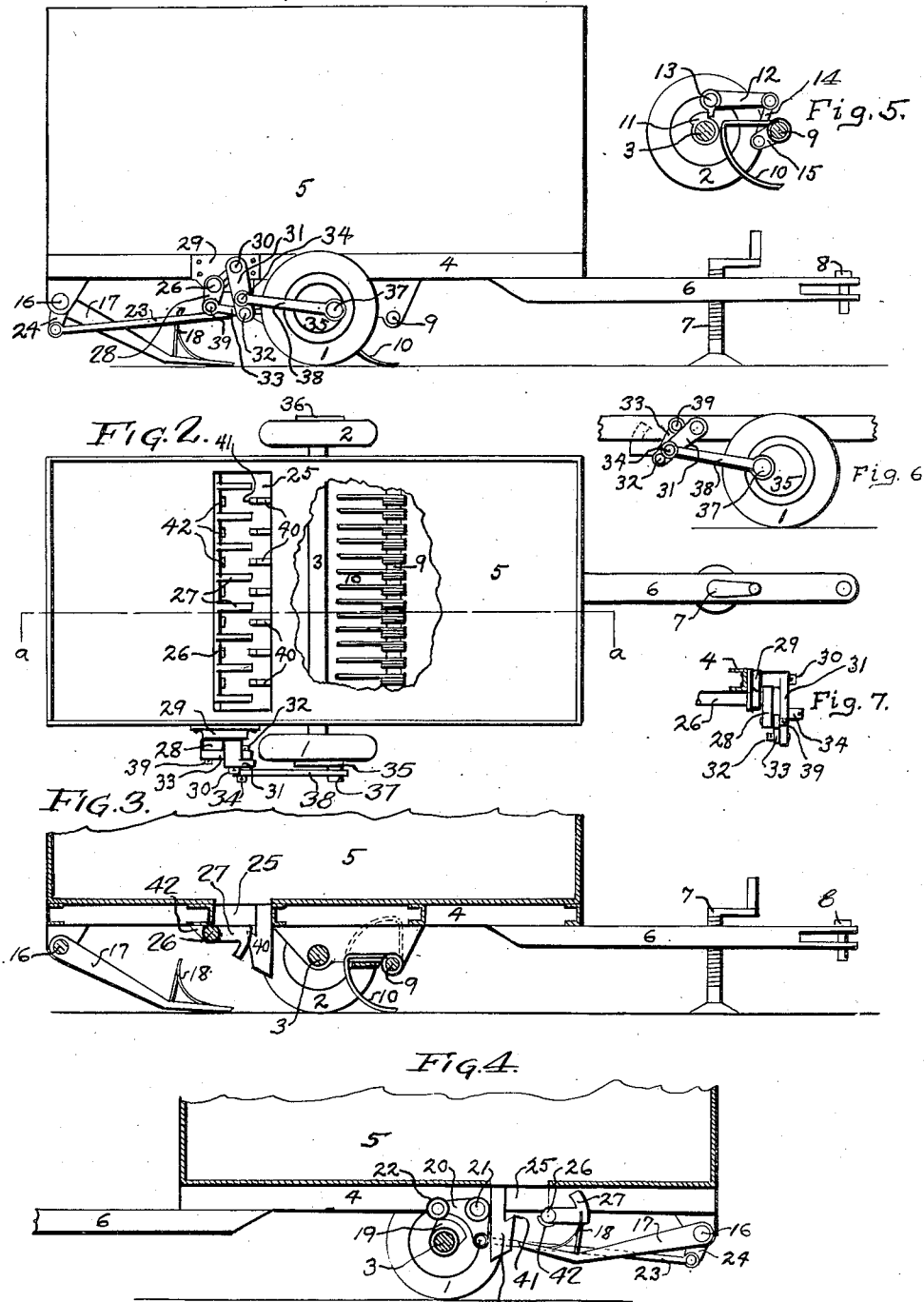
William H. Rodefeld
Inventor Aug. 14, 1951 W. H. RODEFELD 2,564,234
AUTOMATIC LOADING ATTACHMENT FOR HAY WAGONS
Filed Jan. 30, 1948 2 Sheets-Sheet 2
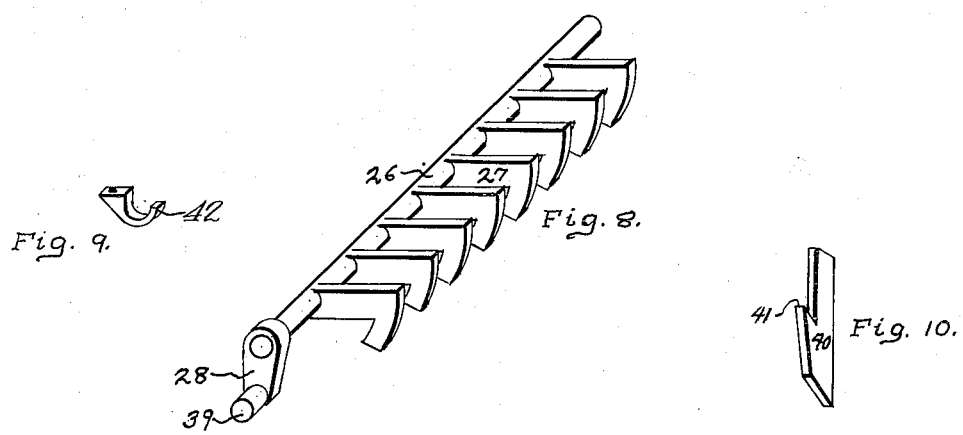
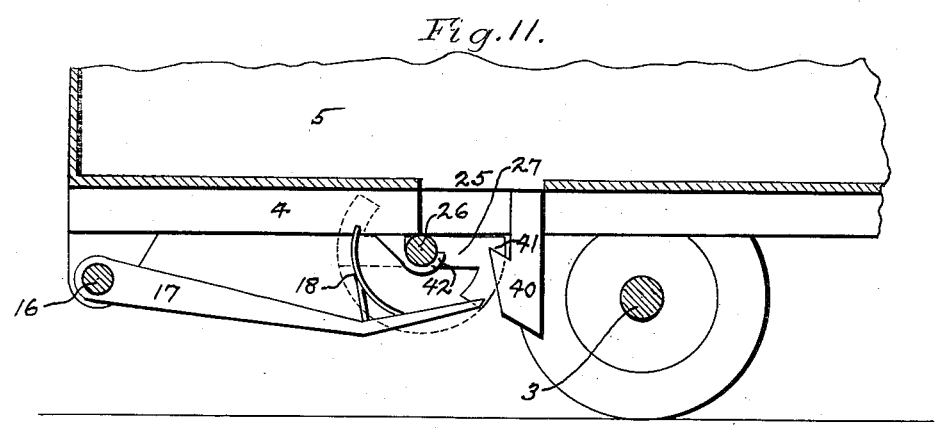
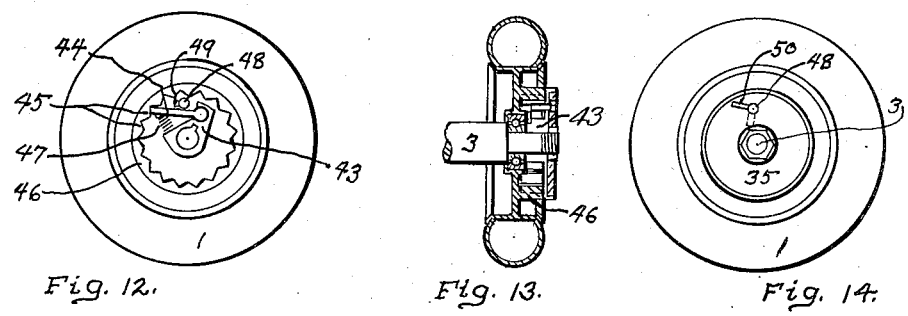
William H. Rodefeld,
Inventor.

Patented Aug. 14, 1951

2,564,234

UNITED STATES PATENT OFFICE 2,564,234

AUTOMATIC LOADING ATTACHMENT FOR HAY WAGONS

William H. Rodefeld, Richmond, Ind.

Application January 30, 1948, Serial No. 5,319

2 Claims. (Cl. 214—81)

This invention relates to machines for taking up hay and similar material.

The object of this invention is to provide a simpler, lower cost, and more efficient automatic machine for harvesting hay and to take up straw or similar material.

I attain this object with the machine shown in the accompanying two sheets of drawings, in which—

Figure 1 is a side view of the machine showing a conveyance in combination with raking and loading mechanism.

Figure 2 is a top view with a section of the floor of a load compartment or load space cut away to show raking teeth below the floor.

Figure 3 is a sectional side view made on line a—a of Fig. 2 but with parts of the ends and sides cut away.

Figure 4 is similar to Figure 3 but with the view being from the opposite side and with the raking teeth omitted and shows a set of tines in raised position and means by which the tines are raised.

Figure 5 is a partial sectional side view showing the axle, the left wheel, one of the raking teeth and means to raise the raking teeth.

Figure 6 is a partial side view showing a wheel, part of the frame and part of the loading mechanism.

Figure 7 shows part of the loading mechanism.

Figure 8 shows part of the loading mechanism consisting of a set of pusher arms and a shaft to which they are fastened.

Figure 9 shows a half bearing one of which supports the pusher arm shaft between each two pusher arms.

Figure 10 shows one of a set of guiding and holding members that provide means to guide material through an opening and means to hold material.

Figure 11 is a sectional view showing part of the machine including part of the loading mechanism.

Figures 12, 13 and 14 show means whereby the mechanism is put in and out of operation.

Similar numerals refer to similar parts throughout the several views.

The right wheel 1, the left wheel 2, and the axle 3 support the machine.

Above the axle 3 is the frame 4. On top of the frame is a load compartment 5. The sides and ends of the load compartment are shown as solid panels however the sides and ends can consist merely of stakes or of stakes and slats or stakes and woven wire or any construction desired to prevent material from falling off the machine.

A tongue 6 extends forward and a jackscrew 7 supports the tongue when it is not hitched to a tractor. A coupling pin 8 is for connecting to the drawbar of a tractor.

Forward of the axle and parallel therewith is a rake tooth shaft 9 and secured thereto are rake teeth 10.

Referring now to Fig. 5 a cam 11 that is secured to axle 3 strikes a lever 12 causing it to swing on its support 13. A link 14 connects lever 12 and an arm 15 that is on the rake tooth shaft 9. It can now be seen that as the axle rotates the cam 11 raises the lever 12 and through the link 14 and the arm 15 the shaft 9 is turned to raise the rake teeth 10. The raised position of the rake teeth 10 is shown by broken lines in Fig. 3.

As the machine travels forward the rake teeth rake up a bunch of material and then rise and drop the material raked in a bunch and then after passing the bunch dropped the rake teeth return to the ground to rake up another bunch of material.

Crosswise of the machine below the back end of the frame is a shaft 16 and fastened thereto and extending forward therefrom are tines 17. The forward ends of tines 17 slide on the ground and pass under the bunched material dropped by the raking teeth. An upward curving projection 18 on the tines controls the position of material on the tines. After the tines have taken up a bunch of material they then rise to the position shown in Figs. 4 and 11. The tines 17 are raised by mechanism shown in Fig. 4 consisting of a cam 19 that is fastened to axle 3 and a bell crank 20 that is pivoted on a pin 21 and that carries a roller 22 that rides cam 19 and a connecting rod 23 that connects the bell crank 20 and an arm 24 that is on the shaft 16.

An opening 25 extends across the floor of the load space. Below the rear edge of opening 25 is a pusher arm shaft 26 and extending therefrom are the pusher arms 27 and on one end of the shaft is an operating arm 28.

Supporting the right end of pusher shaft 26 is a bearing casting 29 (Figs. 1, 2 and 7). Extending from bearing casting 29 forward of and higher than shaft 26 is a heavy pin 30. Mounted to swing on pin 30 is an arm 31. Extending from the inner side of arm 31 at the lower end thereof is a pin 32. Connecting arm 28 on the pusher shaft and pin 32 is a link 33. Extending from the outer side of arm 31 is a pin 34.

A flange 35 is keyed to the right end of axle 3 outside the wheel and a flange 36 is keyed to the left end of axle 3 outside the wheel.

On flange 35 is a crank-pin 37. Connecting crank-pin 37 and the pin 34 on arm 31 is a connecting rod 38.

It can now be seen that crank-pin 37 and the operating arm 28 on the pusher arm shaft are connected by the connecting rod 38, the arm 31 and the link 33.

The reason for the use of arm 31 between the crank-pin 37 and the pusher shaft operating arm 28 is to get a full half turn in the movement of pusher arm shaft 26. It is impossible to turn a shaft a full half turn by a connecting rod moved by a crank but by using the arm and link arrangement shown I obtain this result without resorting to gears or other more complicated means. It is difficult to explain this action however a study of Figs. 1, 2, 6 and 7 should make the action clear. In Fig. 6 the crank-pin 37 is in rearward position and the arm 31 is back with the end of it being in line with and in front of shaft 26 and the arm 28 on shaft 26 is extending upward in position opposite that shown in Fig. 1. The arm 28 does not show in Fig. 6 as it is behind arm 31 and link 33 however the end of pin 39 that extends from arm 28 (see Fig. 8) does show in Fig. 6 and is indicated by numeral 39 in Fig. 6.

Fig. 7 shows the right end of pusher shaft 26 and a section of frame side member 4 and the link 33 and the arm 31 as these parts appear from the rear when in the position shown in Fig. 1.

As the axle of the machine rotates the crank-pin 37 and the connecting rod 38 swing the arm 31 forward and backward. When arm 31 is in forward position the pin 32 at the end thereof is forward of the pin 39 on arm 28 of shaft 26 and connected thereto by the link 33 with link 33 substantially horizontal. As the arm 31 moves rearward the arm 28 swings upward to a vertical position above the shaft 26 with the link 33 going to the position shown in Fig. 6.

It can now be seen that when the axle rotates the pusher arm shaft will oscillate making two half turns for each turn of the axle. The pusher arms 27 on the shaft 26 will therefore swing from rearward position to forward position and back to rearward position. In Fig. 11 the pusher arm 27 is shown in forward position by solid lines and in rearward position by broken lines.

In Fig. 11 the path of the ends of the pusher arms is shown by a broken line. It will be noticed that the curve of the upward projection 18 on tine 17 is concentric with the arc made by the pusher 27 as it swings from one position to the other while the tine 17 is in raised position.

Guiding and holding members 40 (Figs. 2, 3, 10 and 11) extend downward from the front side of the opening in the floor and are located in line with the tines 17. It will be noticed in Fig. 11 that the ends of the pusher arms 27 pass between the tines 17 and pass between the projecting points 41 on the guiding and holding members 40. The purpose of these guiding and holding members 40 is to guide material up through the opening in the floor and to keep it from falling back.

It has now been shown that the rake teeth rake and bunch material and the tines take up the bunched material and raise it and the pusher arms swing forward and backward. The several movements are timed so that when the tines rise with a bunch of material the pusher arms 27 will be in rearward position (broken lines in Fig. 11). The pusher arms 27 then swing downward and forward and then upward and push the material from the tines up over the guides 40 through the opening in the floor.

When the material has been pushed from the tines 17 the said tines then return to the ground to take up the next bunch of material.

Supporting the pusher arms shaft 26 between each two arms is a half bearing 42. The bearings 42 and the points 41 on the holding and guiding members project into the passage for material substantially at opposite positions. After the pusher arms 27 have reached the limit of their forward and upward movement they then swing back and the material is held by the points 41 and the inner ends of bearings 42. Each bunch of material pushes material ahead of it up into the load space.

Figures 12, 13 and 14 show means for turning the axle by the wheels or releasing the wheels to turn on the axle thus putting the mechanism in and out of operation.

On the inner side of each flange, 35 and 36, is a hub extension 43 (Figs. 12 and 13) one side of which extends outward and carries a pawl 44 that engages notches 45 in the inner periphery of a cylindrical extension, 46, outward from the web of each wheel.

It can be seen in Fig. 12 that when the wheel turns clockwise and the pawl 44 is in position shown that the axle will be turned by the wheel. A spring 47 holds the pawl 44 outward. A small shaft 48 passes through each flange just over the pawl 44 and on the inner end of each small shaft 48 is a cam 49. When the shaft is turned the cam 49 presses the pawl inward out of contact with the notches 45 and thus frees the wheel on the axle. On the outer end of each shaft 48 is a trigger 50 by which the shaft is turned. It can now be seen that the mechanism is put out of operation when the trigger 50 is turned to the position shown by broken lines in Fig. 14 and is put in operation when the trigger 50 is turned to the position shown by solid lines in Fig. 14.

Having now shown my invention, I claim:

1. In a machine to take up hay and similar material, raking teeth, means to raise and lower the said raking teeth, forward extending tines, means to raise and lower the said tines, arms extending from a shaft, means to turn the said shaft forward and backward to swing the said arms, upward curving projections on the said tines substantially concentric with the said shaft when the said tines are in raised position, a compartment with an opening adjacent to the said shaft, guiding means adjacent to the said opening and holding means adjacent to the said opening.

2. In a machine to take up hay and similar material, raking teeth, means to raise and lower the said raking teeth, pusher arms extending from a shaft, means to rotate the said shaft forward and backward to swing the said pusher arms, forward extending tines with upward curving top surfaces, means to raise the said tines to a position wherein the curved surfaces thereof are substantially concentric with the said shaft, guiding members located to be near the ends of the said tines when the said tines are in raised position with the position of the said tines and the said guiding members and the said shaft being such that the said pushers move between the said tines when the said tines are in raised position and move between the said guiding members after passing the ends of the said tines.

WILLIAM H. RODEFELD.

REFERENCES CITED

The following references are of record in the file of this patent:

UNITED STATES PATENTS

| Number | Name | Date |
|---|---|---|
| 13,234 | Soule | July 10, 1855 |
| 51,650 | Craven | Dec. 19, 1865 |
| 54,392 | Nevergold et al. | May 1, 1866 |
| 1,782,067 | Hassman | Nov. 18, 1930 |
| 2,050,806 | Rey | Aug. 11, 1936 |
| 2,106,402 | Carlesimo | Jan. 25, 1938 |
| 2,398,327 | Rodefeld | Apr. 9, 1946 |
| 2,405,756 | Rodefeld | Aug. 13, 1946 |
| 2,503,522 | Struthers et al. | Apr. 11, 1950 |